United States Patent
Verma (10) Patent No.: US 10,279,423 B2
(45) Date of Patent: May 7, 2019

(54) APPARATUSES AND METHODS FOR FABRICATING METAL MATRIX COMPOSITE STRUCTURES

(71) Applicant: The Boeing Company, Chicago, IL (US)

(72) Inventor: Ravi Verma, Chesterfield, MO (US)

(73) Assignee: THE BOEING COMPANY, Chicago, IL (US)

(*) Notice: Subject to any disclaimer, the term of this patent is extended or adjusted under 35 U.S.C. 154(b) by 7 days.

(21) Appl. No.: 15/239,386

(22) Filed: Aug. 17, 2016

(65) Prior Publication Data

US 2018/0050420 A1 Feb. 22, 2018

(51) Int. Cl.
*B23K 20/12* (2006.01)
*B23K 20/233* (2006.01)
(Continued)

(52) U.S. Cl.
CPC ........ *B23K 20/1275* (2013.01); *B23K 20/122* (2013.01); *B23K 20/126* (2013.01);
(Continued)

(58) Field of Classification Search
CPC ............ H01R 43/0263; H01R 43/0256; B23K 37/04; B23K 3/087; B23K 3/08;
(Continued)

(56) References Cited

U.S. PATENT DOCUMENTS 5,460,317 A * 10/1995 Thomas .............. B29C 66/1142
228/112.1
5,713,507 A * 2/1998 Holt ...................... B23K 20/123
228/112.1
(Continued)

FOREIGN PATENT DOCUMENTS

CN 102319954 B 8/2015
JP 2007083242 A * 4/2007
(Continued)

OTHER PUBLICATIONS

Extended European Search Report for co-pending European Application No. 17186613.0-1108, dated Jan. 12, 2018 (9 pages).
(Continued)

*Primary Examiner* — Kiley S Stoner
(74) *Attorney, Agent, or Firm* — Joseph F. Harding; The Small Patent Law Group LLC (57) ABSTRACT

A method for forming a metal matrix composite (MMC) structure includes forming an assembly including at least two blocks of a primary phase material sharing an interface at which a secondary phase material is disposed. The assembly has a length, a width, and a thickness. The method also includes clamping the assembly to at least one of urge the at least two blocks toward each other or maintain the at least two blocks at a predetermined position. Also, the method includes passing a rotating friction-stir pin along the interface from the front edge to the rear edge. The friction-stir pin has a mixing length extending at least the width of the assembly, and passing the friction-stir pin along the length of the assembly disperses the secondary phase material into the primary phase material and welds the at least two blocks together.

8 Claims, 6 Drawing Sheets

(51) Int. Cl.
| | |
|---|---|
| *B23K 20/16* | (2006.01) |
| *B23K 20/24* | (2006.01) |
| *B23K 103/10* | (2006.01) |
| *B23K 103/18* | (2006.01) |
| *B23K 103/00* | (2006.01) |
| *B23K 103/16* | (2006.01) |
| *B23K 101/00* | (2006.01) |
| *B23K 103/14* | (2006.01) |
| *B23K 103/08* | (2006.01) |

(52) U.S. Cl.
CPC .......... *B23K 20/127* (2013.01); *B23K 20/128* (2013.01); *B23K 20/1255* (2013.01); *B23K 20/1265* (2013.01); *B23K 20/16* (2013.01); *B23K 20/233* (2013.01); *B23K 20/2336* (2013.01); *B23K 20/24* (2013.01); *B23K 2101/006* (2018.08); *B23K 2103/10* (2018.08); *B23K 2103/14* (2018.08); *B23K 2103/15* (2018.08); *B23K 2103/172* (2018.08); *B23K 2103/18* (2018.08); *B23K 2103/52* (2018.08)

(58) Field of Classification Search
CPC .............. B23K 37/0461; B23K 1/085; B23K 20/122–20/128
USPC ............................................... 228/112.1, 2.1
See application file for complete search history.

(56) References Cited

U.S. PATENT DOCUMENTS

| | | | | |
|---|---|---|---|---|
| 5,718,366 | A * | 2/1998 | Colligan | B23K 20/125 156/580 |
| 5,769,306 | A * | 6/1998 | Colligan | B23K 20/126 228/112.1 |
| 6,045,028 | A * | 4/2000 | Martin | B23K 20/122 228/112.1 |
| 6,199,745 | B1 * | 3/2001 | Campbell | B23K 20/123 228/112.1 |
| 6,264,088 | B1 * | 7/2001 | Larsson | B23K 20/1245 228/112.1 |
| 6,421,578 | B1 * | 7/2002 | Adams | B23K 20/123 228/112.1 |
| 6,516,992 | B1 * | 2/2003 | Colligan | B23K 20/1235 228/112.1 |
| 6,758,382 | B1 * | 7/2004 | Carter | B23K 20/12 228/112.1 |
| 6,994,242 | B2 | 2/2006 | Fuller et al. | |
| 7,461,769 | B2 | 12/2008 | Waldron et al. | |
| 7,464,852 | B2 | 12/2008 | Waldron et al. | |
| 7,971,463 | B2 | 7/2011 | Forrest et al. | |
| 8,164,021 | B1 * | 4/2012 | Ferrando | B23K 20/1255 219/78.13 |
| 8,177,113 | B2 | 5/2012 | Slattery et al. | |
| 8,186,567 | B2 | 5/2012 | Talwar et al. | |
| 8,678,267 | B2 | 3/2014 | Heck et al. | |
| 9,010,613 | B1 | 4/2015 | Matlack et al. | |
| 9,015,948 | B2 | 4/2015 | Talwar et al. | |
| 9,289,849 | B2 | 3/2016 | Matlack et al. | |
| 2004/0195291 | A1 * | 10/2004 | Andersson | B23K 20/1255 228/2.1 |
| 2005/0051602 | A1 * | 3/2005 | Babb | B23K 20/123 228/112.1 |
| 2006/0108394 | A1 * | 5/2006 | Okaniwa | B23K 20/122 228/101 |
| 2006/0169748 | A1 * | 8/2006 | Ezumi | B23K 20/1215 228/112.1 |
| 2006/0260376 | A1 * | 11/2006 | Osame | B21C 23/085 72/269 |
| 2008/0041921 | A1 | 2/2008 | Creehan et al. | |
| 2009/0188968 | A1 * | 7/2009 | Marie | B23K 20/122 228/112.1 |
| 2011/0073634 | A1 * | 3/2011 | Packer | B23K 20/123 228/2.3 |
| 2011/0076419 | A1 * | 3/2011 | Yang | B23K 20/1275 427/554 |
| 2011/0104515 | A1 * | 5/2011 | Kou | B23K 20/1265 428/649 |
| 2013/0075452 | A1 * | 3/2013 | Burford | B23K 20/1255 228/2.1 |
| 2013/0206817 | A1 * | 8/2013 | Tavares | B23K 20/126 228/112.1 |
| 2014/0261900 | A1 * | 9/2014 | Maurer | C22F 3/00 148/512 |
| 2015/0273623 | A1 * | 10/2015 | Kato | B23K 20/1245 228/112.1 |
| 2015/0328714 | A1 * | 11/2015 | Larsson | B23K 20/126 228/112.1 |
| 2015/0336204 | A1 * | 11/2015 | Singh | B23K 20/122 228/112.1 |
| 2015/0375335 | A1 * | 12/2015 | Liu | B23K 20/1245 219/78.13 |
| 2017/0304934 | A1 * | 10/2017 | Carlson | B23K 20/1265 |

FOREIGN PATENT DOCUMENTS

| | | | |
|---|---|---|---|
| JP | 2007222899 A | * | 9/2007 |
| JP | 2009269077 A | * | 11/2009 |
| JP | 2011025297 A | | 2/2011 |
| JP | 2011054793 A | * | 3/2011 |
| JP | 4789253 B2 | * | 10/2011 |
| KR | 101282659 B1 | * | 7/2013 |
| WO | 2014106044 A1 | | 7/2014 |

OTHER PUBLICATIONS

Mohsen et al, "On the Role of Processing Parameters in Producing Cu/SiC Metal Matrix Composites via Friction Stir Processing: Investigating Microstructure, Microhardness, Wear and Tensile Behavior", Materials Characterization; vol. 62, No. 1, Jan. 1, 2011, pp. 108-117, XP055438125, US; ISSN: 1044-5803 DOI: 10.1016/j.matcher.2010.11.005 (10 pages).

Mostafapour et al., "Role of Hybrid Ratio in Microstructural, Mechanical and Sliding Wear Properties of the Al5083/Graphitep/Al2O3p a Surface Hybrid Nanocomposite Fabricated via Friction Stir Processing Method", Materials Science and Engineering: A, vol. 559, Jan. 1, 2013, pp. 549-557, XP055438127, Amsterdam, NL; ISSN: 0921-5093, DOI: 10.1016/j.msea.2012.08.140 (9 pages).

R.S. Mishra, Friction stir welding and processing, Materials Science and Engineering: R: Reports, Mar. 21, 2002, A341, pp. 307-310.

* cited by examiner

APPARATUSES AND METHODS FOR FABRICATING METAL MATRIX COMPOSITE STRUCTURES

FIELD OF EMBODIMENTS OF THE DISCLOSURE

Embodiments of the present disclosure generally relate to fabricating metal matrix composite (MMC) structures, such as sheets or plates.

BACKGROUND OF THE DISCLOSURE

Metal matric composites may be produced by dispersing a second phase powder into a molten metal during casting. Dispersing a powder into a molten metal, however, may be difficult. For example, powder tends to float or to sink and cluster, which may result in uneven distribution. Powder clusters may be difficult to break up, even with vigorous stirring action. The problem may be accentuated in the case of large ingots such as direct-chill ingots cast for aluminum rolling mill process.

SUMMARY OF THE DISCLOSURE

Accordingly, improvement of forming MMC structures or components is provided in various embodiments disclosed herein.

Certain embodiments of the present disclosure provide a method for forming a metal matrix composite (MMC) structure. The method includes forming an assembly including at least two blocks of a primary phase material sharing an interface at which a secondary phase material is disposed. The assembly has a length extending from a front edge to a rear edge, a width extending perpendicular to the length, and a thickness. The method also includes clamping the assembly to at least one of urge the at least two blocks toward each other or maintain the at least two blocks at a predetermined position. Also, the method includes passing a rotating friction-stir pin along the interface from the front edge to the rear edge. The friction-stir pin has a mixing length extending at least the width of the assembly, and passing the rotating friction-stir pin along the length of the assembly disperses the secondary phase material into the primary phase material and welds the at least two blocks together.

Certain embodiments of the present disclosure provide a friction-stir assembly. The friction-stir assembly includes a first platen and a second platen, first and second chucks, and a friction-stir pin. The first platen and the second platen are configured to retain an assembly. The assembly includes at least two blocks of a primary phase material sharing an interface at which a secondary phase material is disposed. The assembly has a length extending from a front edge to a rear edge, a width extending perpendicular to the length, and a thickness. The first and second chucks are disposed on opposite sides of the width of the assembly and configured to pass along the length of the assembly. The friction-stir pin has first and second ends supported in the first and second chucks, respectively, and has a mixing length extending at least the width of the assembly. Passing the rotating friction-stir pin disperses the secondary phase material into the primary phase material and welds that at least two blocks together.

Certain embodiments of the present disclosure provide a friction-stir welded structure. The structure is formed by forming an assembly including at least two blocks of a primary phase material sharing an interface at which a secondary phase material is disposed, the assembly having a length extending from a front edge to a rear edge, a width extending perpendicular to the length, and a thickness; clamping the assembly to at least one of urge the at least two blocks toward each other or maintain the at least two blocks at a predetermined position; and passing a friction-stir pin along the interface from the front edge to the rear edge, wherein the friction-stir pin has a mixing length extending at least the width of the assembly, wherein the passing the friction-stir pin disperses the secondary phase material into the primary phase material and welds the at least two blocks together to form the structure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments of the present disclosure employ friction-stir welding at an interface between two components of a primary phase material at which a secondary phase material is disposed. The friction-stir welding mixes the secondary phase material within the primary phase material and welds the two components of the primary phase material together to form a unitary component or structure (e.g., sheet or plate) that is an MMC structure with the secondary phase material distributed within the primary phase material.

Various embodiments provide a solid state method of producing an MMC using a rotating pin, rod, or wire that laterally traverses through a metal/second-phase/metal sandwich, heating and plasticizing the metal and dispersing the second-phase (e.g., a ceramic powder) into the metal layers. The stirring action in various embodiments leads to bonding of the metal layers into a monolithic structure with fine dispersion of the second phase.

Embodiments of the present disclosure provide systems and methods for forming MMC structures, such as plates and sheets. Various embodiments provide improved convenience in forming MMC structures. Various embodiments provide improved distribution of a secondary phase material in a primary phase material. Various embodiments provide a solid state method of dispersing a second material in to a metal plate. Various embodiments provide for producing an MMC structure (e.g., plate) with higher stiffness and strength, and lower density, than the base metal.

Figure 1:
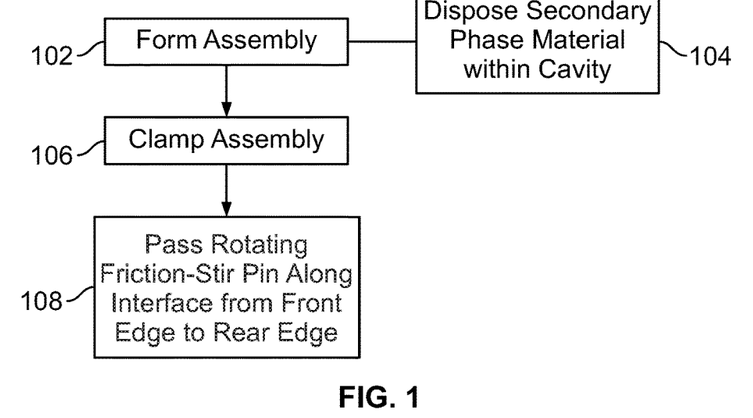
FIG. 1 provides a flowchart of a method according to an embodiment of the present disclosure.

FIG. 1 provides a flowchart of a method 100 for forming a metal matrix composite (MMC) structure (e.g., a plate or sheet), in accordance with various embodiments. The method 100, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

Figure 2:
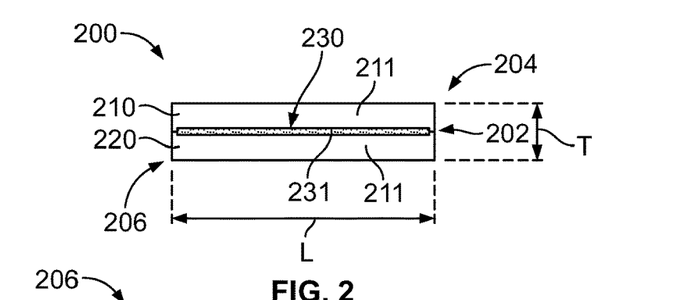
FIG. 2 provides a schematic side view of an assembly to be friction-stir welded in accordance with various embodiments.
Figure 3:
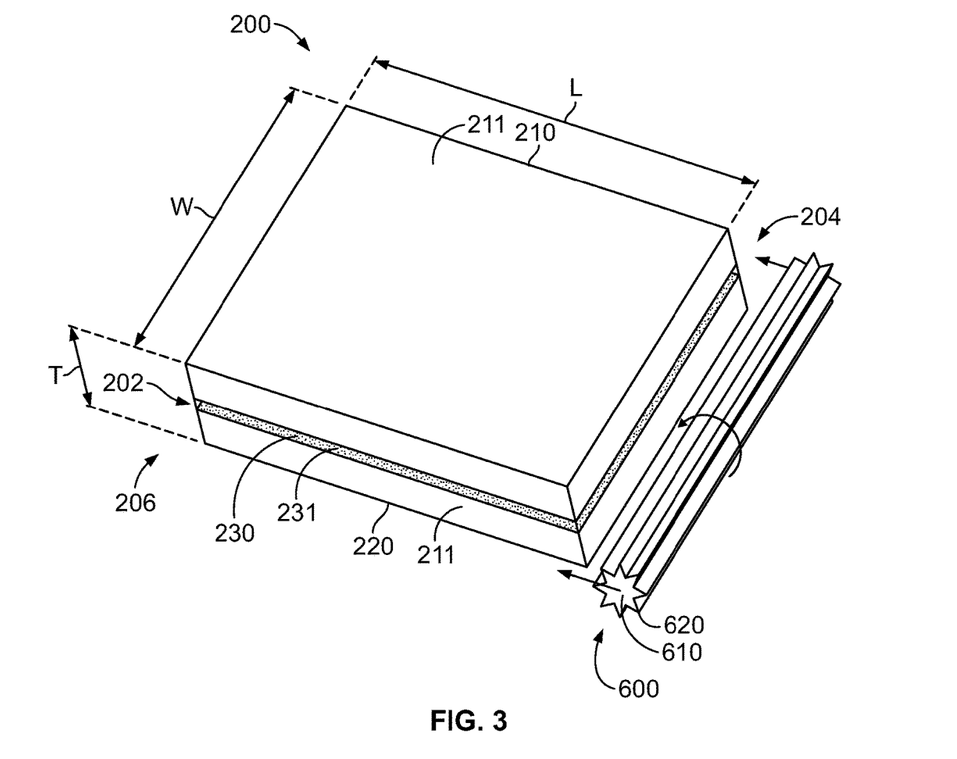
FIG. 3 provides a schematic perspective view of an assembly to be friction-stir welded in accordance with various embodiments.

At 102, an assembly is formed. The assembly includes at least two blocks of a primary phase material. The at least two blocks share at least one interface at which a secondary phase material is disposed. For example, for an assembly with two blocks, there will be one interface between the blocks. As another example, for an assembly with three blocks, there will be two interfaces between the blocks (e.g., a first interface between first and second blocks and a second interface between second and third blocks. The assembly has a length extending from a front edge to a rear edge, a width extending perpendicular to the length, and a thickness. FIG. 2 provides a side schematic view of an assembly to be friction stir-welded in accordance with various embodiments, and FIG. 3 provides a perspective view of an assembly to be friction stir-welded.

As seen in FIG. 2, the depicted assembly 200 includes a first block 210 and a second block 220. The first block 210 and second block 220 are made of a primary phase material 211. The primary phase material 211 in various embodiments may be a metal. For example, the primary phase material 211 may be Aluminum, Titanium, or Magnesium. The depicted assembly 200 also includes an intermediate layer 230 located at an interface 202 between the first block 210 and the second block 220. The intermediate layer 230 is of a secondary phase material 231. In some embodiments, the secondary phase material 231 may be a metal. In some embodiments, the secondary phase material 231 may be a non-metal, such as a ceramic powder. Generally, the first block 210 and second block 220 are to be welded together while mixing the secondary phase material 231 with the primary phase material 211 as part of the method 100. As best seen in FIGS. 2 and 3, the assembly 200 has a length L, a width W, and a thickness T. By way of example, the thickness T may be between ½ inch thick and 3 inches thick in various embodiments. Other thicknesses may be used in other embodiments. The length L extends from a front edge 204 to a rear edge 206.

Figure 4:
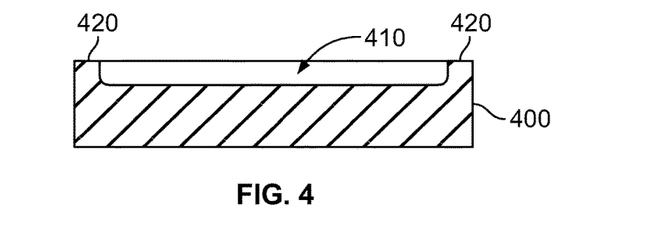
FIG. 4 provides a side sectional schematic view of a block having a cavity in accordance with various embodiments.

In some embodiments, the intermediate layer 230 may be provided as a sheet (e.g., a sheet of a second metal disposed between blocks of a first metal). In other embodiments, the intermediate layer 230 of the secondary phase material 231 may be a powder, or, as another example, a sheet or wafer made by compacting a powder. For example, at 104 of the depicted method 100, the secondary phase material is disposed (e.g., deposited) within a cavity of at least one of the two blocks of the primary phase material. FIG. 4 provides a side sectional schematic view of a block 400 having a cavity 410. The block 400 may be utilized, for example, as one or both of the first block 210 or the second block 220 in various embodiments. As seen in FIG. 4, the block 400 includes a shoulder 420 extending around a perimeter of the block 400 to define the cavity 410. It may be noted that the shoulder 420 may extend along the entire perimeter of the block 400 to retain the secondary phase material (e.g., ceramic powder) at an interface between two blocks. In some embodiments, block 400 may be tack welded or otherwise secured to a second block during transportation of an assembly (e.g., assembly 100) including block 400.

Returning to FIG. 1, at 106, the assembly is clamped. For example, the assembly may be clamped between two platens of a press. The clamping process at least one of urges the at least two blocks of the assembly toward each other, or maintains the at least two blocks at a predetermined position. Generally, the clamping is performed to maintain the components of the assembly in a desired position or relationship between the components during a friction-stir welding process.

Figure 5:
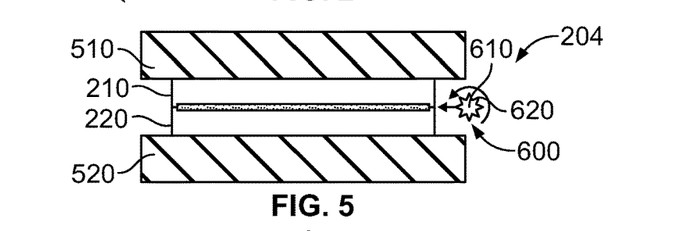
FIG. 5 depicts a schematic side view of the assembly of FIG. 2 in a clamped position.

FIG. 5 depicts a schematic side view of the assembly 200 of FIG. 2 in a clamped position. As seen in FIG. 5, the assembly 200 is disposed between a first platen 510 and a second platen 520 of a press. A friction-stir pin 600 is disposed initially proximate the front edge 204 of the assembly 200.

Figure 6:
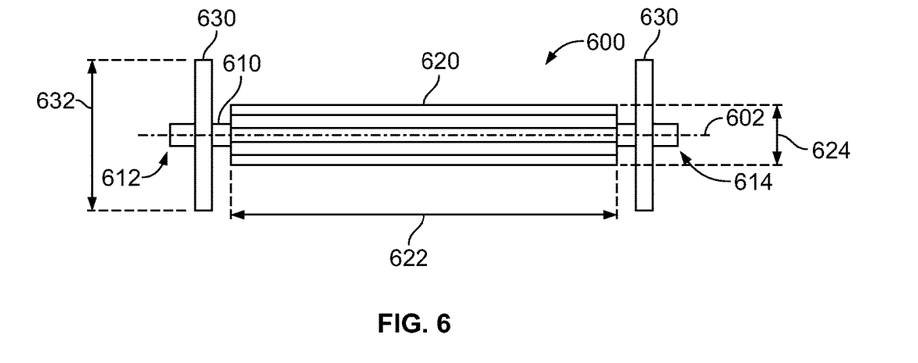
FIG. 6 depicts a side schematic view of a friction-stir pin in accordance with various embodiments.

FIG. 6 provides a side schematic view of a friction-stir pin 600 formed in accordance with various embodiments. The friction-stir pin 600 defines an axis 602 along which a shaft 610 extends from a first end 612 to an opposite second end 614. Each of the first end 612 and the second end 614 may be configured to be accepted in a chuck and/or driven by a motor to rotate the pin. Supporting the friction-stir pin 600 at each end in various embodiments helps to reduce bending or flexing during advancement of the friction-stir pin 600 through an assembly (e.g., assembly 200). Flutes 620 extend radially from the shaft 610 and define a mixing length 622. It may be noted that different geometries may be used for flutes 620 in various embodiments. For example, the flutes 620 may extend in straight rows in some embodiments, or in spiraled rows in other embodiments. Serrations or other shapes may be provided in the flutes 620 as well in various embodiments. Shoulders 630 are disposed on either side of the flutes 620. It may be noted that gaps are shown between the ends of the flutes 620 and the shoulders 630 in the illustrated embodiment; however, such gap need not necessarily be present in other embodiments. Generally the shoulders 630 are configured to help retain material in place along sides or edges of an assembly being friction-stir welded. Accordingly, the shoulders 630 have a diameter 632 that is more than a pin diameter 624 defined by the flutes 620. The diameter 632 may be less than a distance between platens of a press with which the friction-stir pin 600 is to be used. The flutes 620 may be made of a relatively hard material, such as Tungsten Carbide, to maintain rigidity and dimensional integrity of the pin at the high temperature generated by the friction-stir process and facilitate mixing of metals during friction-stir welding. The pin diameter 624, in some embodiments, may be between 25% and 85% of the thickness of an assembly (e.g., between 25% and 85% of thickness T of assembly 200) being friction-stir welded. In some embodiments, the pin diameter 624 may be between ½ and ⅓ the thickness of an assembly being friction-stir welded.

Returning to FIG. 1, at 108, the friction-stir pin is passed along the interface from the front edge of the assembly to the rear edge of the assembly. In various embodiments, the friction-stir pin has a mixing length that extends at least the width of the assembly being friction-stir welded. For example, friction-stir pin 600 may be used to friction-stir weld assembly 200, with the mixing length 622 being at least as long as the width W, with the friction-stir pin 600 positioned so that the mixing length passes through the entire width W of the assembly 100, in contrast to certain conventional friction-stir welding process where a cantilevered pin only extends through a portion of an object being friction-stir welded. As the friction-stir pin is passed along the length of the assembly, the friction-stir pin is also rotated (e.g., by one or more associated motors). For example, in some embodiments, the friction-stir pin is supported at opposite ends (e.g., first end 612 and second end 614 of friction-stir pin 600). Further, in some embodiments, the friction-stir pin may be driven at the opposite ends (e.g., a first motor may drive the friction-stir pin from the first end 612 and a second motor may drive the friction-stir pin from the second end 614). Supporting the pin at both ends in various embodiments reduces bending or flexing of the pin as it is passed through the width of the assembly to be welded. The two motors may be synchronized with each other.

Passing the friction-stir pin along the interface along the length of the assembly disperses the secondary phase material into the primary phase material and welds the at least two blocks of the primary phase material together. Accordingly, a unitary structure with the secondary phase material distributed throughout the primary phase material is provided in various embodiments. It may be noted that in some embodiments, the interface may be aligned with the axis of the friction-stir pin, while in other embodiments the interface may be offset from the axis of the friction-stir pin. Generally, in various embodiments the interface is located within a zone or band defined by the pin diameter (e.g., the diameter of the flutes). It may be noted that, as used herein, the term "pin diameter" refers to a characteristic of the friction-stir pin (e.g., the diameter of the flutes) and does not limit the actual zone or thickness at which mixing may occur. Mixing in various embodiments may occur outside of the pin diameter of the friction-stir pin, much as a wake from a propeller extends beyond the propeller diameter. As the friction-stir pin is advanced along the length of the assembly, the rotational speed of the friction-stir pin as well as the lateral speed at which the friction-stir pin is advanced along the length of the assembly from the front edge to the rear edge may be controlled to achieve a desired mixing and/or welding. For example, the speeds may be controlled to maintain a temperature high enough for enhanced flow of the materials being mixed while maintaining the temperature low enough to remain below a melting temperature of one or more materials.

Figure 7:
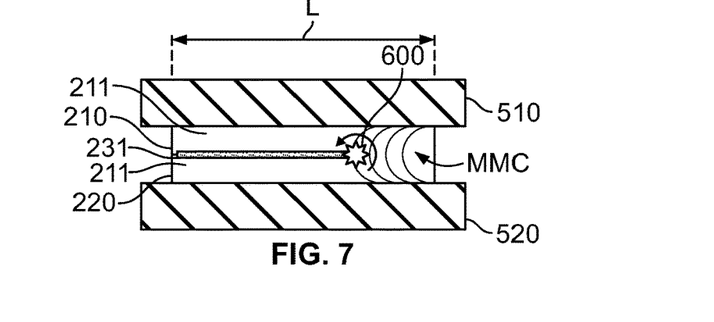
FIG. 7 depicts a side schematic view of the assembly of FIG. 2 being friction-stir welded.

FIG. 7 depicts a schematic side view of the assembly 200 of FIG. 2 in a clamped position during friction-stir welding. As seen in FIG. 7, as the friction-stir pin 600 is advanced along the length L of the assembly 200, the secondary phase material 231 is mixed with the primary phase material 211 and the first block 210 and the second block 220 are welded together, forming a unitary MMC behind the friction-stir pin 600 (in the direction of advancement).

Figure 8:
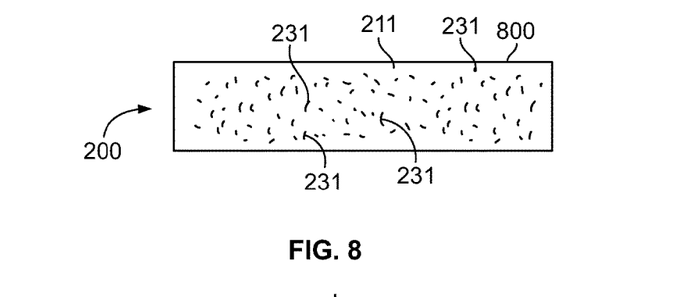
FIG. 8 depicts a schematic side view of the assembly of FIG. 2 after friction-stir welding.

FIG. 8 depicts a schematic side view of the assembly 200 after friction-stir welding. As seen in FIG. 8, the assembly 200 has been processed by method 100 into a unitary friction-stir welded structure 800 that has the secondary phase material 231 distributed throughout the primary phase material 211 and the first block 210 and the second block 220 welded together to form the unitary friction-stir welded structure 800.

Figure 9:
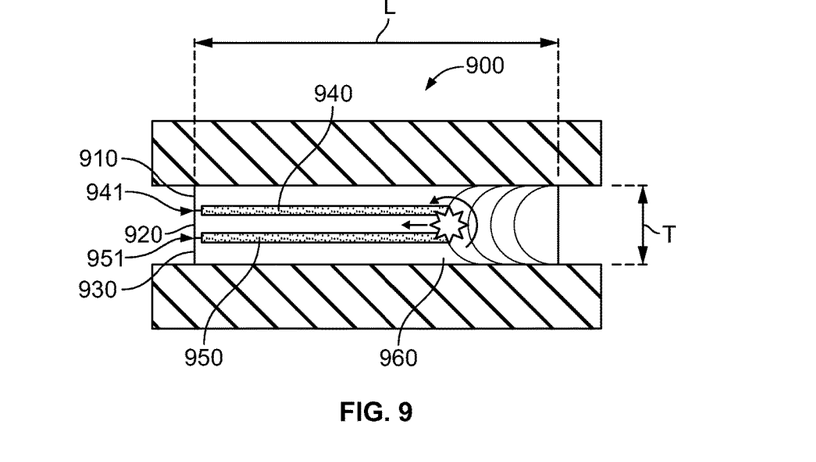
FIG. 9 depicts an assembly being friction stir-welded that includes three blocks and two interfaces in accordance with various embodiments.

It may be noted that in alternate embodiments, more blocks and interfaces may be used. FIG. 9 depicts an assembly 900 being friction stir-welded that includes three blocks and two interfaces. The assembly 900 includes a first block 910, a second block 920, and a third block 930. The first block 910, second block 920, and third block 930 are made of one or more primary phase materials. The assembly 900 defines two interfaces between the blocks. Namely, the assembly 900 defines a first interface 941 between the first block 910 and the second block 920, and a second interface 951 between the second block 920 and the third block 930. A first intermediate layer 940 is disposed at the first interface 941, and a second intermediate layer 950 is disposed at the second interface 951. The first intermediate layer 940 and the second intermediate layer 950 are made of one or more secondary phase materials. Generally, the secondary phase material(s) is mixed or distributed throughout the primary phase material(s) by the friction-stir welding as the friction-stir pin 960 passes along the length L of the assembly 900, while the primary phase material(s) is welded together by the friction-stir welding. In the illustrated embodiments, the friction-stir pin 960 is positioned at a mid-point of the thickness T of the assembly 900 with the first intermediate layer 940 and the second intermediate layer 950 on opposite sides of the mid-point. It may be noted that the particular locations and/or numbers of interfaces and intermediate layers of secondary phase materials may be varied to provide a desired level of uniformity of distribution of the secondary phase material throughout the primary phase material, for example.

It may also be noted that the depicted example assembly 900 is provided by way of example and not limitation, and that other arrangements may be employed in alternate embodiments. For example, more than three blocks and two interfaces may be employed in various embodiments. As another example, while one friction-stir pin is shown in the illustrated embodiment, more than one friction-stir pin may be employed in alternated embodiments. For example, in some embodiments, one friction-stir pin may be provided per interface. As another example, more interfaces may be utilized in other embodiments. For example, four interfaces may be provided, with two friction-stir pins (two interfaces per pin).

It may further be noted that, while in some embodiments, the same primary phase material may be used for each block and the same secondary phase material may be used for each intermediate layer, in other embodiments different materials may be used. For example, in some embodiments, different materials may be used for the primary phase material for two or more blocks. For example, in the illustrated embodiment, the first block 910 may be made of a first material (e.g., a first metal), the second block may be made of a second material (e.g., a second metal), and the third block may be made of a third material (e.g., a third metal). Alternatively or additionally, different materials may be used for the secondary phase material for two or more interfaces. For example, in the illustrated embodiment, the first intermediate layer 940 may be made of a fourth material (e.g., a fourth metal and/or a first ceramic powder), and the second intermediate layer 950 may be made of a fifth material (e.g., a fifth metal and/or a second ceramic powder). Different materials for different blocks and/or intermediate layers may be used in various embodiments to provide a gradient, or variable properties throughout the thickness of a resulting structure.

Figure 10:
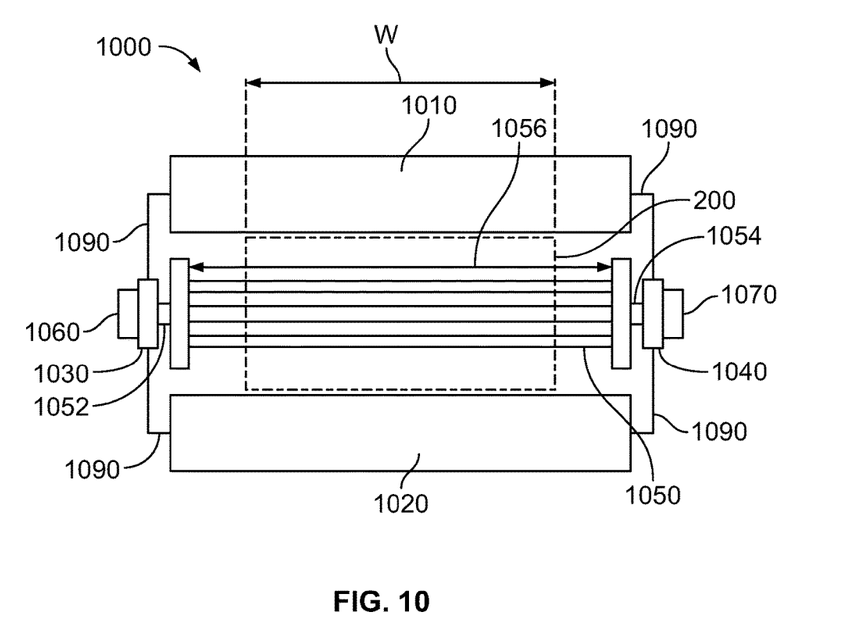
FIG. 10 provides a schematic end view of a friction-stir assembly formed in accordance with various embodiments.
Figure 11:
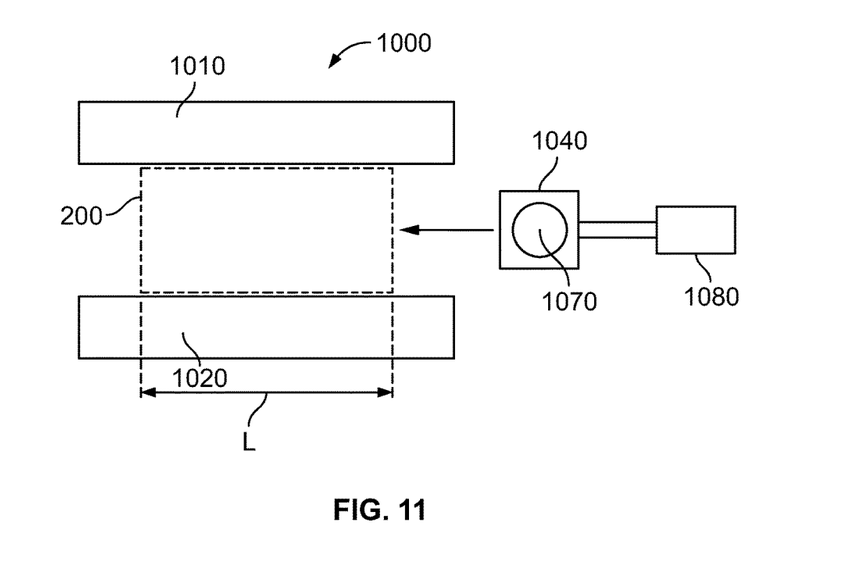
FIG. 11 provides a side schematic view of the friction-stir assembly of FIG. 10.

FIG. 10 provides a schematic end view of a friction-stir assembly 1000 formed in accordance with various embodiments, and FIG. 11 provides a side schematic view of the friction-stir assembly 1000. As seen in FIGS. 10 and 11, the friction-stir assembly 1000 is configured to accept an assembly (e.g., assembly 200) that is to be friction-stir welded as discussed herein.

As seen in FIGS. 10 and 11, the friction-stir assembly 1000 includes a first platen 1010, a second platen 1020, a first chuck 1030, a second chuck 1040, and a friction-stir pin 1050. The various components of the friction-stir assembly 1000 may be mounted to a frame 1090 (shown schematically as connecting lines in FIG. 10 for ease and clarity of illustration) configured to secure the components in desired positions, and/or to restrain or guide the movements of various components. For example, the first platen 1010 and the second platen 1020 may be urged toward each other (to claim the assembly 200) or away from each other (to release the assembly 200). The friction-stir pin 1050 may be secured in the first chuck 1030 and the second chuck 1040, with the first chuck 1030 and the second chuck 1040 urged along the length of the assembly 200 to friction-stir weld the assembly. The friction-stir pin 1050 may be configured generally similarly, for example, to friction-stir pin 600 discussed herein. As best seen in FIG. 10, the friction-stir pin 1050 includes a first end 1052 secured in the first chuck 1030, and a second end 1054 secured in the second chuck 1040. The depicted friction-stir pin 1050 has a mixing length 1056 (e.g., defined by flutes) that extends at least the width W of the assembly 200 to provide friction-stir welding across the entire width of the assembly 200.

The first platen 1010 and the second platen 1020 are configured to retain an assembly to be stir-friction welded (e.g., assembly 200, shown in phantom lines in FIGS. 10 and 11). The first platen 1010 and/or the second platen 1020, for example, may be connected to one or more cylinders or other actuators configured to urge the first platen 1010 and the second platen 1020 toward each other or away from each other.

The first chuck 1030 and the second chuck 1040 are disposed on opposite sides of the width W of the assembly 200 (or on opposite sides of the first platen 1010 and the second platen 1020), and are configured to pass along the length L of the assembly 200 (or the length of the first platen 1010 and the second platen 1020). For example, the chucks may be disposed in linear guides and actuated by a cylinder or other linear actuator 1080 (see FIG. 11) to advance along the length of the assembly being friction-stir welded. The guides may also be used to position the friction-stir pin 1050 at a desired position (e.g., aligned with an interface of the assembly 200). In the illustrated embodiment, each chuck also includes an associated motor used to rotate the friction-stir pin 1050 during friction-stir welding. As best seen in FIG. 10, the friction-stir assembly 1000 includes a first motor 1060 associated with the first chuck 1030, and also includes a second motor 1070 associated with the second chuck 1040. The first motor 1060 drives the first end 1052 of the friction-stir pin 1050 (e.g., rotates the first end 1052) while the second motor 1070 drives the second end 1054 of the friction-stir pin 1050 (e.g., rotates the second end 1054). The first motor 1060 and the second motor 1070 may be synchronized to rotate the ends of the friction-stir pin 1050 at the same time and at the same rotational speed to reduce or eliminate any torsion that may be caused by unsynchronized rotation. The motors in the illustrated embodiment are used to rotate the friction-stir pin 1050 while the friction-stir pin 1050 is advanced along the length of the assembly 200 to friction-stir weld the assembly 200. Passing the stir-friction pin 1050 along the length L of the assembly 200 disperses a secondary phase material (e.g., a material located at an interface between two primary phase materials) into a primary phase material and welds blocks of the primary phase material together.

Figure 12:
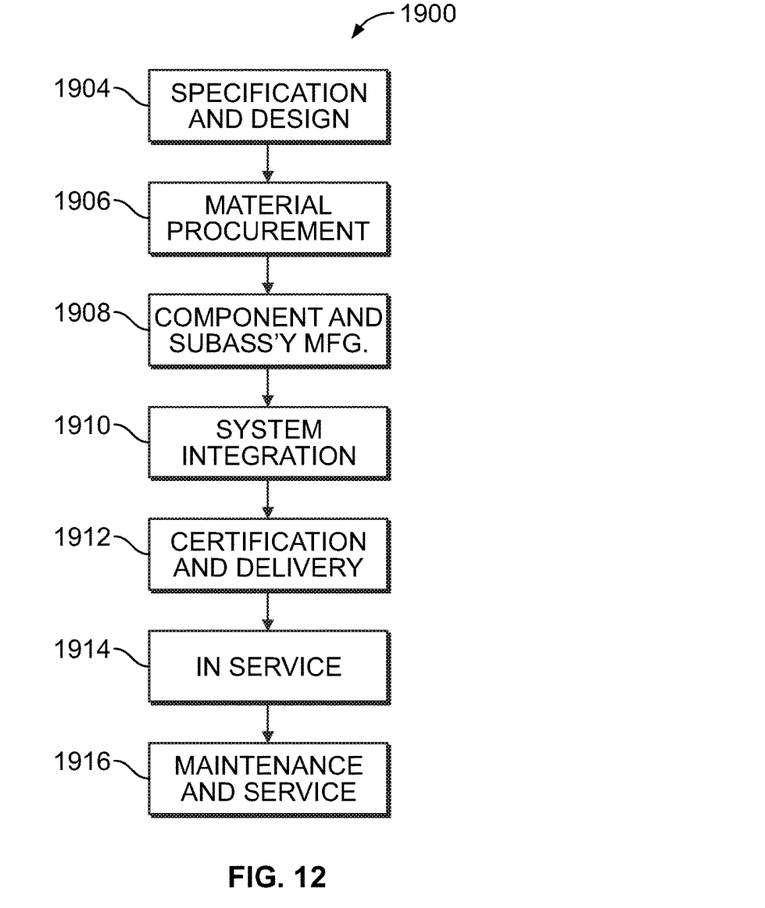
FIG. 12 is a block diagram of aircraft production and service methodology.
Figure 13:
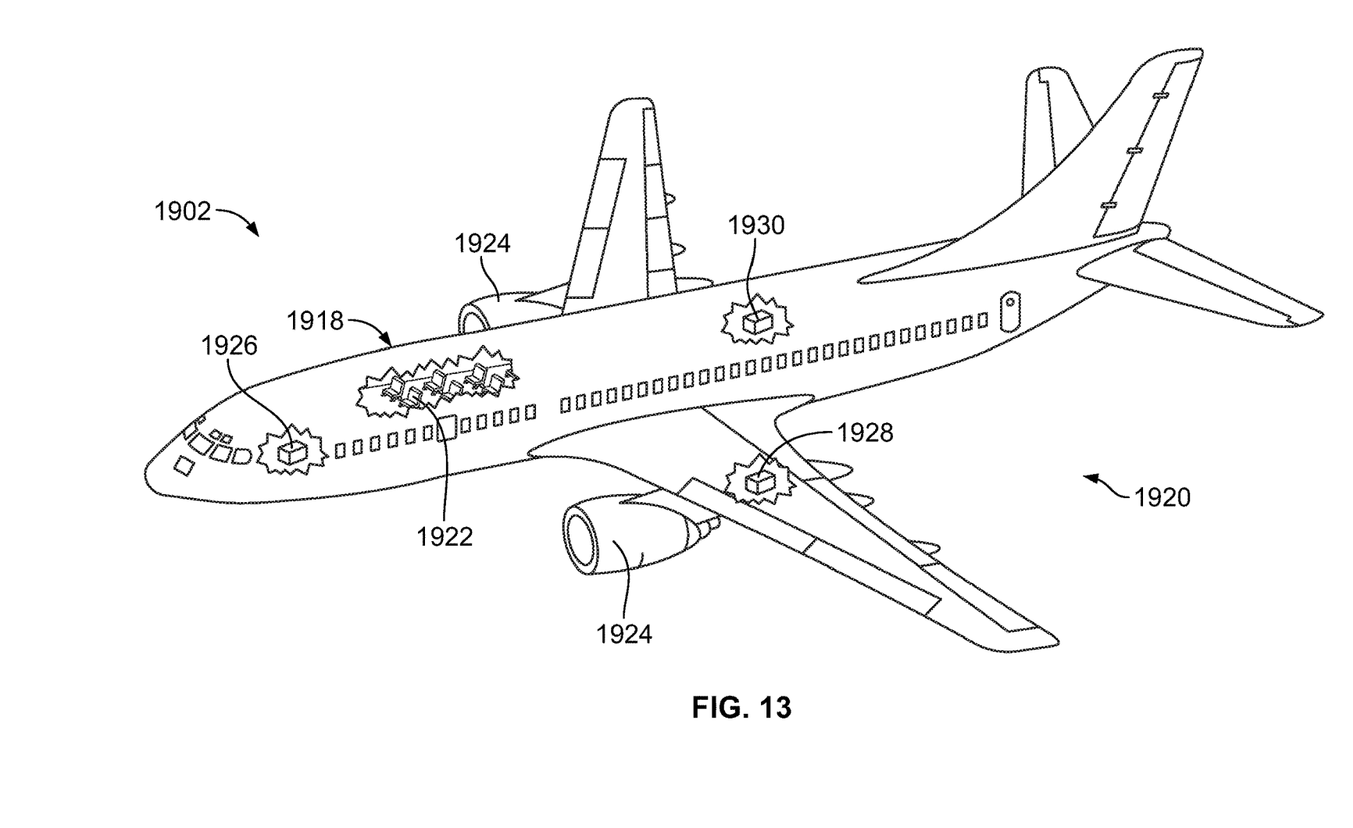
FIG. 13 is a schematic illustration of an aircraft.

Examples of the present disclosure may be described in the context of aircraft manufacturing and service method 1900 as shown in FIG. 12 and aircraft 1902 as shown in FIG. 13. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908 or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with airframe 1918.

Apparatus(es) and method(s) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902.

Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It should be noted that the particular arrangement of components (e.g., the number, types, placement, or the like) of the illustrated embodiments may be modified in various alternate embodiments. For example, in various embodiments, different numbers of a given component may be employed, a different type or types of a given component may be employed, a number of components (or aspects thereof) may be combined, a given component may be divided into plural components, one or more aspects of one or more components may be shared between components, a given component may be added, or a given component may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for forming a metal matrix composite (MMC) structure, the method comprising:
   forming an assembly including at least two blocks of a primary phase material sharing an interface at which a secondary phase material is disposed, the assembly having a length extending from a front edge to a rear edge, a width extending perpendicular to the length, and a thickness;
   clamping the assembly to at least one of urge the at least two blocks toward each other or maintain the at least two blocks at a predetermined position;
   passing a rotating friction-stir pin along the interface from the front edge to the rear edge, wherein the friction-stir pin is supported at opposite ends as the friction-stir pin is passed along the interface, wherein the friction-stir pin has a mixing length extending at least the width of the assembly, wherein the passing the friction-stir pin disperses the secondary phase material into the primary phase material and welds the at least two blocks together.

2. The method of claim 1, further comprising driving the friction-stir pin at the opposite ends as the friction-stir pin is passed alone the interface.

3. The method of claim 1, wherein forming the assembly comprises disposing the secondary phase material within a cavity of at least one of the at least two blocks.

4. The method of claim 1, wherein the at least two blocks comprise at least three blocks defining two interfaces.

5. The method of claim 4, wherein the at least three blocks comprise three blocks comprised of different metals from each other.

6. The method of claim 4, wherein the secondary phase material comprises a first secondary phase material disposed at a first interface and a second secondary phase material disposed at a second interface.

7. The method of claim 1, wherein the primary phase material comprises Aluminum.

8. The method of claim 1, wherein the secondary phase material comprises a ceramic powder.

\* \* \* \* \*